United States Patent [19]
Cole

[11] Patent Number: 4,752,049
[45] Date of Patent: Jun. 21, 1988

[54] LEADING EDGE SLAT/ANTI-ICING SYSTEM AND METHOD FOR AIRFOIL

[75] Inventor: James B. Cole, Mercer Island, Wash.

[73] Assignee: The Boeing Company, Seattle, Wash.

[21] Appl. No.: 814,603

[22] Filed: Dec. 30, 1985

[51] Int. Cl.⁴ .............................................. B64D 15/04
[52] U.S. Cl. ................................ 244/134 B; 244/214; 244/207
[58] Field of Search ........... 244/134 R, 134 B, 134 C, 244/214, 201, 207, 210, 199

[56] References Cited

U.S. PATENT DOCUMENTS

| | | |
|---|---|---|
| 2,157,281 | 5/1939 | Coanda . |
| 2,886,264 | 5/1959 | Seager . |
| 3,275,265 | 9/1966 | Alvarez-Calderon . |
| 3,363,859 | 1/1968 | Watts . |
| 3,596,854 | 8/1971 | Haney, Jr. ............................ 244/199 |
| 3,705,700 | 12/1972 | Custer ................................... 244/207 |
| 3,889,903 | 6/1975 | Hilby . |
| 3,917,193 | 11/1975 | Runnels, Jr. . |
| 3,933,327 | 1/1976 | Cook et al. . |
| 4,099,691 | 7/1978 | Swanson et al. . |
| 4,285,482 | 8/1981 | Lewis ................................... 244/207 |

FOREIGN PATENT DOCUMENTS 746714 11/1944 Fed. Rep. of Germany ...... 244/207
1103426 11/1955 France .

OTHER PUBLICATIONS

Edward W. Kruppa, "A Wind Tunnel Investigation of the Kasper Vortex Concept", AIAA 13th Annual Meeting and Technical Display Incorporating the Forum of the Future of Air Transportation, Jan. 10–13, 1977.

*Primary Examiner*—Galen Barefoot
*Attorney, Agent, or Firm*—Hughes & Cassidy

[57] ABSTRACT

A leading edge/anti-icing assembly for an airfoil comprising a leading edge slat having a nose section defining a heat exchange chamber. Anti-icing air directed into the heat exchange chamber flows rearwardly through the slat so as to have a deicing function, and is then discharged in a rearward direction from the trailing edge of the slat. Thus, the anti-icing air not only performs an anti-icing function over the upper surface of the slat, but also contributes to anti-icing over the upper surface portion of the main wing rearwardly of the trailing edge of the slat.

9 Claims, 4 Drawing Sheets

LEADING EDGE SLAT/ANTI-ICING SYSTEM AND METHOD FOR AIRFOIL

BACKGROUND OF THE INVENTION

Field of the Invention

The present invention relates to a leading edge assembly and method for an airfoil incorporating an anti-icing or deicing system where bleed air is used not only for effective anti-icing, but also in a manner to optimize aerodynamic considerations.

Background Art

Quite commonly, thermal deicing of a leading edge slat or flap is accomplished by directing bleed air from the engine through a duct in the leading edge of the slat or flap and placing the relatively hot bleed air in heat exchange relationship with the exterior surface of the slat or flap.

There are a number of problems associated with such systems. For example, one difficulty is utilizing the bleed air in a manner that the entire slat or flap outer surface is placed in heat exchange relationship with the hot air. In addition, there is the problem of defrosting the wing upper surface located rearwardly of the flap.

Another problem area relates to the discharge of the bleed air after the bleed air has accomplished its heat exchange function. One prior art method of accomplishing this is to exhaust the thermal anti-icing air through ports cut in the lower surface of the leading edge of the slat. However, this can undesirably increase aerodynamic drag.

A search of the patent literature has revealed a number of patents, some of which relate to the use of anti-icing or deicing air in the leading edge of a slat, flap or other member.

U.S. Pat. No. 3,363,859—Watts shows a leading edge flap which has a deployed position where it extends downwardly and forwardly from the leading edge of the wing, and a stowed position where the nose of the flap is rotated rearwardly to a stowed position at the lower part of the leading edge portion of the wing. In the extended position, anti-icing air is directed into the duct at the leading edge of the flap to be in heat exchange relationship with the leading edge of the flap. Then the anti-icing air travels rearwardly and upwardly in a passageway formed adjacent the upper surface of the flap or slat. This anti-icing air is then discharged through a lower surface portion of the flap at a rearward location so that the anti-icing air flows into the slot or channel formed by the flap and the leading edge of the main wing structure. (This is shown in FIG. 9 of that patent.)

U.S. Pat. No. 3,917,193—Runnels illustrates a boundary layer control and anti-icing apparatus for an aircraft wing where there is an anti-icing duct in the leading edge of the main wing structure, and also an anti-icing duct in the leading edge of the flap. In the deployed position, the flap forms a slot or gap with the leading edge of the main wing structure, and the flap is moved to its stowed position by rotating the nose portion of the flap rearwardly to a stowed position at the lower forward surface portion of the main wing structure. When the flap is in its deployed position, boundary layer air is discharged from the duct in the flap to flow rearwardly over the upper exposed surface of the flap. Also, boundary layer air is discharged from the duct in the nose portion of the main wing structure to flow upwardly along the nose of the wing in the area of the gap and then rearwardly along the upper surface of the main wing structure.

In U.S. Pat. No. 3,933,327—Cook, there is shown a leading edge of a jet engine nacelle where thermal anti-icing air is directed into a passageway adjacent the nose portion and inner surface portion of the nacelle inlet. This anti-icing air then flows rearwardly to be passed in a radially inward direction through a plurality of holes which are formed for accoustic purposes.

U.S. Pat. No. 2,157,281—Coanda shows an airfoil where air under pressure is discharged from a tube at the front of the wing through an upwardly extending slot.

U.S. Pat. No. 2,886,264—Seager illustrates a stall roll control device for a vertical takeoff airplane where boundary layer control air is discharged from manifold tubes.

U.S. Pat. No. 3,275,265—Alvarez-Calderon discloses an airfoil where there is a tube in the leading edge of a slat or flap to discharge boundary layer control air at the location of the tube to flow over the outside surface of the slat or flap.

U.S. Pat. No. 3,889,903—Hilby shows an apparatus to provide boundary layer control air at the leading edge of an airfoil.

U.S. Pat. No. 4,099,691—Swanson et al illustrates yet another device to discharge boundary layer control air at the leading edge of an airfoil.

French patent No. 1,103,426 (a translation of which is not available at this time) appears to show a number of devices which discharge air from within the airfoil to an outside location. It appears that FIGS. 1—6 show devices to discharge the air at the trailing edge, while FIGS. 7—8 show a device to discharge the air at a lower forward portion of the airfoil.

By way of background information, in the March 16, 1985 issue of "Flight International", there appears an article relating to vortex flaps, disclosing how these might be used to improve lift to drag ratio, for example in a delta wing.

An article entitled "A Wind Tunnel Investigation of the Kasper Vortex Concept", authored by Edward W. Kruppa, and published at the AIAA 13th Annual Meeting And Technical Display Incorporating The Forum Of The Future Of Air Transportion, discusses the "Kasper vortex lift wing" and discloses a use of special flaps to control the feeding of vortices and vortex shedding. U.S. Pat. No. 3,831,805 is cited in the article, and it is also stated that Kasper suggests the use of blowing to energize the vortex and create super circulation.

SUMMARY OF THE INVENTION

The present invention provides a leading edge assembly for an airfoil of an aircraft. There is an airfoil having a fixed leading edge airfoil structure, providing a leading edge for the airfoil, with the airfoil also having a trailing edge portion, and upper and lower surfaces extending rearwardly from the leading edge.

There is a leading edge member mounted to the fixed leading edge structure so as to be movable between at least two operating positions, namely a first retracted position for cruise, and a second deployed position. This leading edge member comprises a nose section having an exterior surface and defining a heat exchange chamber to contain anti-icing air which passes through the chamber in heat exchange relationship with the exterior surface. The leading edge member also comprises an aft section having a forward portion connected to the nose section and also a rear portion. This aft section has an upper surface portion extending from the front portion to a trailing edge of the rear portion. The aft section defines a heat exchange passageway means having a forward inlet to receive anti-icing air from the chamber and a rear trailing edge outlet positioned at the trailing edge and opening in a rearward direction from the trailing edge so as to discharge anti-icing air along a path having a substantial rearward alignment component generally parallel with the upper surface portion of the aft section adjacent to the trailing edge of the leading edge member.

The leading edge member is characterized in that when the leading edge member is in at least one of the operating positions, the trailing edge of the leading edge member is positioned immediately adjacent to the upper surface of the airfoil in a manner that the de-icing air discharged from the trailing edge of the leading edge member flows immediately over the upper surface of the airfoil so as to be in heat exchange relationship therewith.

There is means to direct anti-icing air into said heat exchange chamber in the nose section so as to cause the anti-icing air to flow through the passageway means in the aft section of the leading edge member to pass from the trailing edge of the leading edge member.

In the preferred form, the leading edge member is characterized in that in the retracted position, the nose section of the leading edge member is positioned adjacent to and forwardly of the leading edge airfoil structure, and the trailing edge of the leading edge member is positioned above a forward part of the upper surface of the airfoil, with the trailing edge of the leading edge member being positioned immediately adjacent to the upper surface of the airfoil.

The leading edge member is further characterized in that with the leading edge member in the deployed position, the leading edge member is at a location which is further forward than a position of the leading edge member at the retracted position. Further, the trailing edge of the leading edge member is adjacent to the upper surface of the airfoil at an anti-icing air discharge location which is forwardly of a location where the trailing edge of the leading edge member is positioned when the leading edge member is in the retracted position.

In one embodiment, the aft portion of the leading edge member comprises a structural section defining a plurality of longitudinally extending heat exchange passageways which comprise said heat exchange passageway means. These passageways extend from the front portion to the rear portion of the aft section. More specifically, this structural section comprises a plurality of interconnecting structural members, each having a cross-sectional configuration which is a generally U-shaped configuration.

As another embodiment, the structural section comprises a plurality of tubular members arranged in side by side relationship. These tubular members taper to a relatively smaller height dimension in a rearward direction, with the tubular members having at rear portions thereof a relatively flattened configuration.

As a further modification, the trailing edge outlet can be arranged so that the air discharged from the outlet imparts a vortex motion to air flow traveling rearwardly of the trailing edge.

In the preferred form of the present invention, the leading edge member comprises a leading edge slat which in its stowed position has the nose section of the leading edge member positioned adjacent to and forwardly of the leading edge airfoil structure, and the trailing edge of the leading edge member being positioned above a forward part of the upper surface of the airfoil, with the trailing edge of the leading edge member being positioned immediately adjacent to the upper surface of the airfoil.

Then the slat is movable to an intermediate position where the nose section is located further forwardly of the leading edge airfoil structure, but with the trailing edge still being immediately adjacent to the upper surface of the airfoil. Then the leading edge slat has a fully deployed position where the leading edge slat forms with the leading edge airfoil structure a slot located between the slat and the leading edge airfoil structure.

In the method of the present invention, a leading edge assembly is provided as described above. Anti-icing air is directed through the heat exchange chamber and through the heat exchange passageway means in the aft section of the leading edge member. This air is discharged from the trailing edge of the leading edge member so that, with the trailing edge of the leading edge member being immediately adjacent to the upper surface of the airfoil, the air discharged from the trailing edge of the leading edge member has an anti-icing effect over that portion of the upper surface of the airfoil that is positioned immediately rearwardly of the trailing edge of the leading edge member. The leading edge member is desirably deployed as a leading edge slat, so as to be movable between the retracted position and an intermediate position, where the air discharged from the trailing edge of the leading edge member still has a de-icing function. Then the slat is further movable to a fully deployed position forming a slot with the leading edge airfoil structure.

Other features will become apparent from the following detailed description.

DESCRIPTION OF THE PREFERRED EMBODIMENTS

Figure 1:
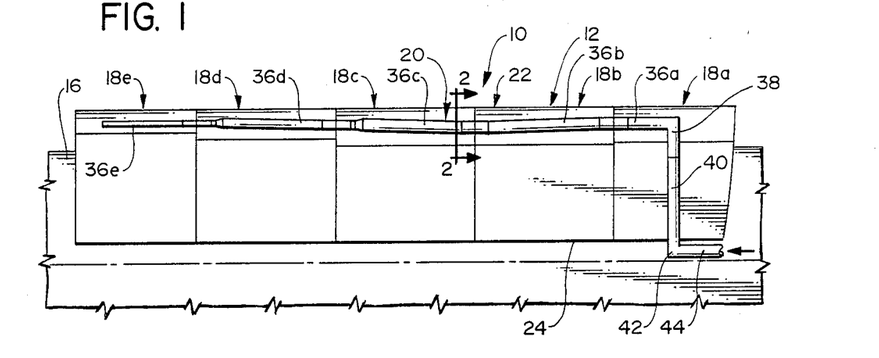
FIG. 1 is a semi-schematic top plan view of an airfoil incorporating the leading edge assembly of the present invention.

With reference to FIG. 1, there is shown a wing 10 of an airplane having a wing leading edge assembly 12 incorporating the teachings of the present invention. This leading edge assembly 12 comprises the fixed leading edge structure 16 of the wing 10, leading edge slats 18, and a deicing system 20 deployed in the slats 18.

Figure 2:
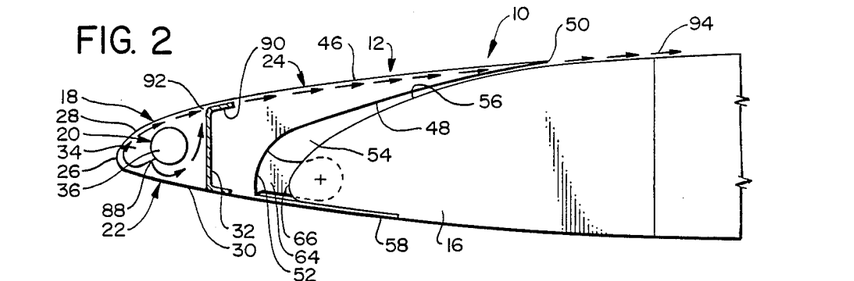
FIG. 2 is a sectional view taken along line 2—2 of FIG. 1 and illustrating the leading edge assembly of the present invention with the leading edge slat of the assembly in its stowed position for cruise.
Figure 3:
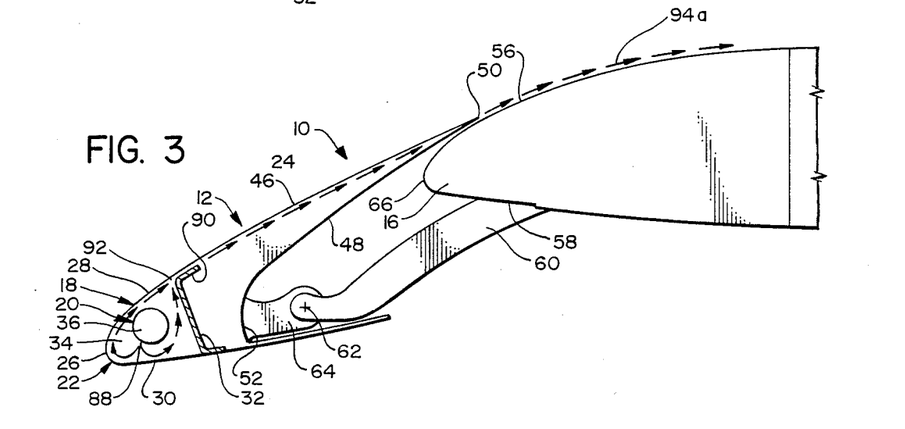
FIG. 3 is a view similar to FIG. 2, illustrating the slat of the leading edge assembly in its intermediate position for takeoff.
Figures 4, 5, 6:
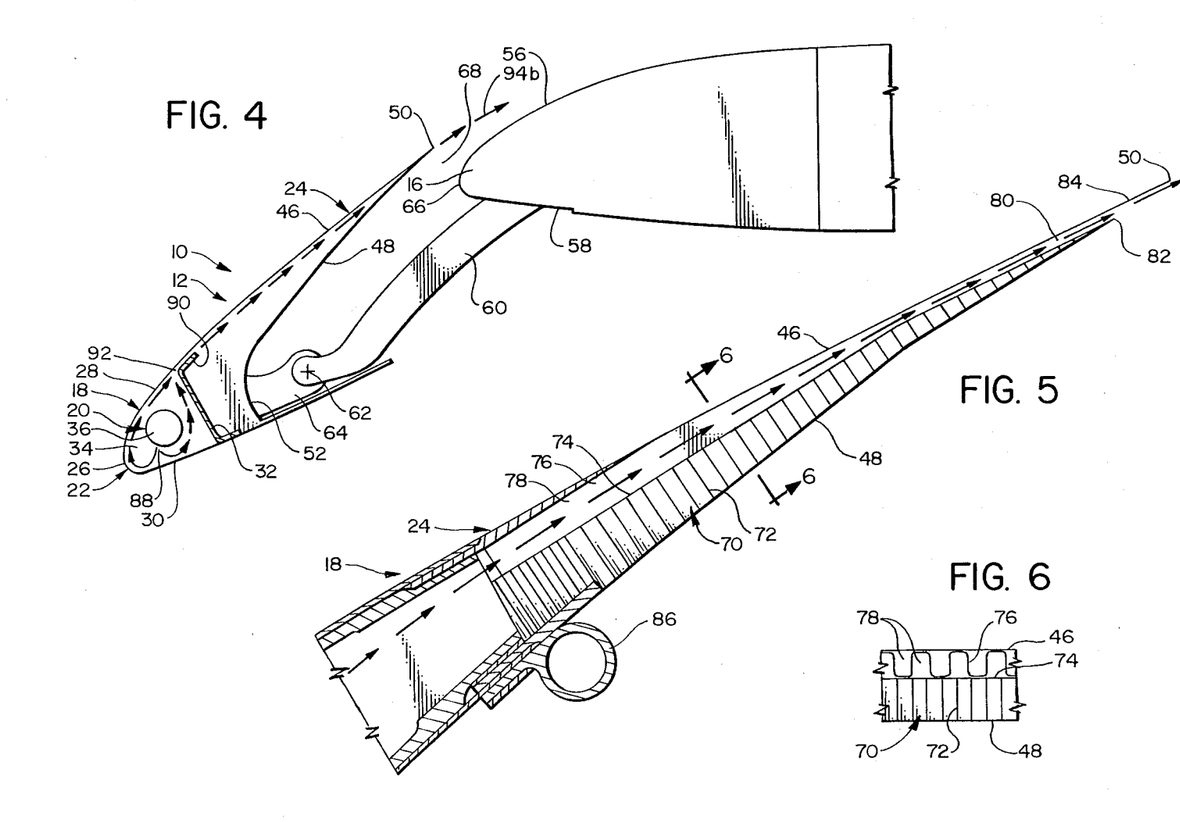
FIG. 4 is a view similar to FIGS. 2 and 3, illustrating the leading edge slat in its fully deployed position forming an aerodynamic slot with the leading edge of the main wing.
FIG. 5 is a sectional view taken along the same lines as FIGS. 2—4, and showing one embodiment of the trailing edge structure of the slat.
FIG. 6 is a sectional view taken along line 6—6 of FIG. 5.

In FIGS. 2—4, one of the leading edge slats 18 is shown somewhat semi-schematically. In general, this slat 18 comprises a forward or nose portion 22 and an aft portion 24. More particularly, the nose portion 22 comprises a leading edge surface 26, an upper forward surface portion 28, and a lower surface portion 30. The nose portion 22 further comprises a main, spanwise extending structural beam 32 which is spaced rearwardly from the leading edge 26 and forms with the leading edge 26 and with the upper and lower surface portions 28 and 30 an anti-icing chamber 34 which extends along substantially the entire leading edge 26. The anti-icing system 20 comprises a main anti-icing duct 36 positioned within the forward anti-icing chamber 34.

In the arrangement shown in FIG. 1, there is a plurality of leading edge slats 18, which are designated 18a–18e, respectively. There is shown a single anti-icing duct extending through the anti-icing chambers 34 of all five of the slats 18a–e, and the diameter of the duct 36 decreases in an outboard direction. For example, an inboard section 36a of the duct could be approximately a 3 inch diameter, an intermediate section 36d of a diameter of 2.5 inches, and the outboard section 36e of a diameter of 1.75 inches.

With further reference to FIG. 1, the inboard end of the anti-icing duct 36 is formed with an elbow section 38 which connects to a telescoping duct section 40 that in turn connects to an elbow 42 of a duct 44 which is positioned in the forward portion of the wing fixed leading edge structure 16. This duct 44 supplies bleed air from the engine to the anti-icing duct 36.

With reference to FIG. 2 and following, the aft section 24 of the slat 18 has an upper surface portion 46, a lower surface portion 48, and a trailing edge 50. The upper surface portion 46 extends rearwardly from the upper forward surface portion 28 of the nose portion 22 so as to form a continuous upper aerodynamic surface with the surface portion 28. The lower rear portion of the forward part of the aft section 24 of the slat 18 is formed with a rear surface 52 that defines a recessed area 54 which, with the slat 18 in the stowed position of FIG. 2, accommodates the fixed structure 16 of the wing 10. The lower surface portion 48 of the aft section 24 of the slat 18 extends rearwardly from the surface 52 to the trailing edge 50. The upper and lower surface portions 46 and 48 converge toward one another in a rearward direction to the trailing edge 50. As will be disclosed more fully hereinafter, the bleed air is directed from this trailing edge 50 in a rearward direction to optimize the aerodynamic flow of the air over the wing upper surface.

The leading edge slat 18 is mounted to the wing leading edge fixed structure 16 so as to be movable between three main operating positions. First, as shown in FIG. 2, there is the retracted position which is the cruise configuration. In the retracted position, the nose portion 22 is positioned just in front of, and closely adjacent to, the fixed leading edge 16 of the wing 10. The aft section 24 of the slat 18 is positioned above an upper forward surface portion 56 of the wing fixed leading edge structure 16, and the trailing edge 50 of the slat 18 is positioned to be in contact with (or at least very closely adjacent to) the upper forward surface portion 56. Also, in the stowed position, the lower slat surface portion 30 extends below the forwardmost portion of the wing fixed leading edge 16 and blends aerodynamically into a lower forward surface portion 58 of the wing 10.

To move the slat 18 to its various operating positions, the leading edge assembly 12 is provided with suitable actuating means which is or may be conventional. As shown herein, the actuating means comprises a track 60 which is pivotally connected at 62 to a rearward extension 64 rigidly connected to the aft slat portion 24 of the slat 18. For example, this track 60 could be mounted at a flap track position in the main wing leading edge assembly 12. In addition to the track 60, there can be provided other track members movably mounted in respective track positions, these being arranged to program the movement of the slat 18 so that the slat 18 moves to the precisely desired locations throughout its movement from the fully retracted position (shown in FIG. 2) to the fully deployed position (shown in FIG. 4).

In FIG. 3, the slat 18 is shown in its intermediate position which is the position for takeoff. As illustrated in FIG. 3, the slat 18 has been moved from the position of FIG. 2 downwardly and forwardly from the wing fixed leading edge structure 16. In moving from the fully retracted position of FIG. 2 to the intermediate position of FIG. 3, the trailing edge 50 remains in contact with, or closely adjacent to (so as functionally to be in contact with), the upper forward surface portion 56 of the wing fixed leading edge 16. More particularly, in the position of FIG. 3, the trailing edge 50 is positioned a very short distance rearwardly of the extreme forward end 66 of the wing fixed leading edge structure 16 so that a substantial portion of the upper forward surface portion 56 of the wing fixed leading edge 16 is exposed as an upper aerodynamic surface portion of the total wing 10. Further, the slat 18 is positioned so that the upper surface portion 46 of the slat 18 is aerodynamically aligned with the exposed portion of the upper forward surface portion 56.

As the slat 18 moves from the intermediate position of FIG. 3 to the fully deployed position of FIG. 4, the slat 18 moves further forwardly and downwardly from the wing fixed leading edge 16. Further, the overall movement of the slat 18 is such that the trailing edge 50 moves out of contact with the upper forward surface portion 56 of the wing fixed leading edge 16 so as to form an aerodynamic slot 68 between the wing fixed leading edge 16 and the aft section 24 of the slat 18.

Reference is now made to FIG. 5, which illustrates in more detail a first embodiment of the slat 18 and more particularly the structure of the aft section 24 of the slat 18. In a chordwise cross-section, the skin members which form the upper and lower surface portions 46 and 48 of the trailing edge portion of the aft section 24 of slat 18 define a general wedge shape. The aft section 24 of the slat 18 has upper and lower structural components which occupy the entire volume in the rear part of the aft slat section 24. There is a lower honeycomb section 70 which is or may be of conventional design, this comprising a honeycomb core 72 sandwiched between the skin forming the lower surface portion 48 and an intermediate sheet 74. Positioned above the honeycomb section 70 is a corrugated section 76 which in transverse section comprises a plurality of innerconnecting U-shaped members. The corrugated section 76 thus defines a plurality of longitudinally extending passageways 78.

Both the honeycomb section 70 and the corrugated section 76 taper in a rearward direction. Thus, the depth dimension of the passageways 78 taper in a rearward direction to terminate in relatively thin exhaust nozzles 80. Thus, the bleed air (i.e. the anti-icing air) which is received in the passageways 78 is exhausted rearwardly from the nozzles 80 at a location between the rear edge 82 of the honeycomb section 70 and the rear edge 84 of the skin that forms the upper surface portion 46 of the slat 18. As shown herein, the rear edge 84 extends moderately beyond the rear edge 82 of the honeycomb section 70.

Also shown in FIG. 5 is a compressible seal member 86 located at a lower forward portion of the aft section 24 of the slat 18. When the slat 18 is in the retracted position of FIG. 2 or moved moderately forwardly of the position in FIG. 2, this seal member 86 is in contact with the wing fixed leading edge 16 upper surface 56 so as to stop airflow between the slat 18 and the surface 56, thereby precluding air flow from the lower surface to the upper surface of the wing and the consequent loss of wing lift.

To describe the operation of the present invention, let it be assumed that the slat 18 is in the fully retracted position of FIG. 2. The relatively hot bleed air (e.g. at approximately 400° F.) is directed from the duct 44 through the elbow 42, duct section 40 and elbow 38 to the anti-icing duct 36, so as to travel in an outboard direction through the duct 36. Along the length of the duct 36, there is a plurality of openings indicated schematically at 88 to discharge the relatively hot bleed air into the anti-icing chamber 34 of each of the slats 18 of each of the leading edge assemblies 12. The arrangement of these openings 88 is such so as to optimize the flow pattern of the bleed air against the skin which forms the leading edge 26 and the upper and lower surface portions 28 and 30 so as to optimize the anti-icing effect. As shown herein, the air is directed from the duct 36 in a forward and downward direction so as to initially strike the forward part of the lower surface portion 30 and then circulate in two curved paths through the upper rear portion of the anti-icing chamber 34. The upper flange 90 of the nose beam 32 is spaced a moderate distance downwardly from the skin forming the upper forward surface portion 28 and joined thereto by appropriate structural members so as to form an inlet 92 leading from the anti-icing chamber 34. The bleed air (i.e. anti-icing air) that flows through the forward portion of the slot aft section 24 and then into the inlet 92 then passes through the longitudinal passageways 78 formed by the corrugated section 76. This arrangement places this air into heat exchange relationship with the upper surface portion 46 of the trailing edge portion 24 of the slat 18. As the air proceeds rearwardly in the passageways 78, the air performs an anti-icing or deicing function relative to the upper surface portion 46.

Finally, the anti-icing air in the passageway 78 exits rearwardly from the nozzles 80 so as to pass immediately over that part of the upper forward surface portion 56 of the wing fixed leading edge 16. This airflow, indicated at 94, has a beneficial effect in providing a certain degree of anti-icing or deicing on that part of the upper wing surface 56 located immediately rearwardly of the trailing edge 50 of the slat 18.

When the slat 18 is in the intermediate position of FIG. 3, the anti-icing/deicing operation of the leading edge assembly 12 is substantially the same as that described with reference to FIG. 2, except that, with the slat 18 being positioned further forwardly, the airflow (indicated at 94a) exiting from the nozzles 80 pass over the wing upper surface 56 at a more forward location. As in the cruise configuration of FIG. 2, the flow 94a has, relative to the upper wing surface 56, a beneficial anti-icing or deicing function.

In addition to the anti-icing benefits of the leading edge assembly 12, there are the aerodynamic considerations. In the prior art configurations known to the applicant, the means employed to discharge the anti-icing air has tended to be a source of drag on the wing. However, it will be noted that in the present invention, the bleed air is discharged in a rearward direction, generally parallel to the surrounding airstream, so that any detrimental drag effect is minimized. In fact, if the energy level of the discharged air is sufficiently high, it is quite possible that an aerodynamic benefit may be achieved. Attention is directed particularly to the landing configuration illustrated in FIG. 4. With the slat lower surface 48 forming an aerodynamic slot with the wing fixed leading edge upper surface 56, there can, depending upon the particular wing angle of attack, be a tendency for the flow to separate along the upper airfoil surface a moderate distance rearwardly of the trailing edge 50 of the slat 18. The flow of high energy anti-icing air 94b can have a beneficial effect in avoiding separated flow. Further, there can be the benefit of thrust augmentation in the cruise and take-off positions, FIGS. 2 and 3.

Figures 7, 8, 9:
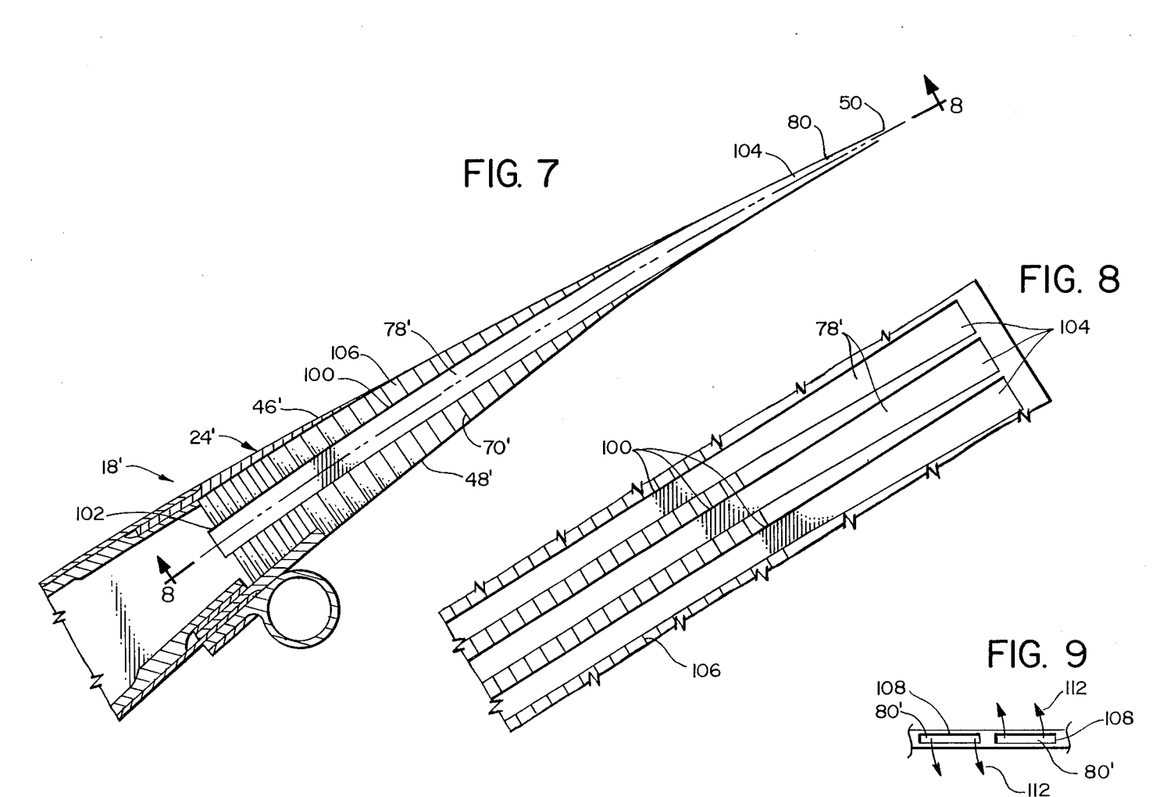
FIG. 7 is a sectional view, taken along the same line as FIG. 5, and showing a second configuration of the trailing edge structure of the slat.
FIG. 8 is a sectional view taken along line 8—8 of FIG. 7.
FIG. 9 is a rear view of the exhaust end of two of the discharge tubes of the embodiment of FIGS. 7 and 8, showing semi-schematically a modified arrangement of the exhaust nozzle of that embodiment.

A second embodiment of the present invention is shown in FIGS. 7 and 8. Components of this second embodiment which are similar to components of the first embodiment will be given like numerical designations, with a prime (') designation distinguishing those of the second embodiment.

The slat 18' has a forward nose portion (not shown for ease of illustration) which is or can be identical to the nose portion 22 of the first embodiment, and also an aft section 24'. The aft section 24' has upper and lower surface portions 46' and 48', and also a trailing edge 50'. However, instead of having a corrugated section to define through passageways for the bleed air (as illustrated at 76 and 78 with regard to the first embodiment), there is provided a plurality of elongate tubes 100. The forward portions 102 of these tubes 100 are cylindrical in transverse section. The rear portions 104 of the tubes 100 are flattened in a tapered fashion so that the heighth dimension (i.e. thickness dimension) of these tubes 100 decreases in a rearward direction. Thus, the longitudinal passageways 78' defined by the tubes 100 become thinner relative to the thickness dimension and wider relative to the lateral dimension. With this arrangement, relatively flat nozzles 80' are provided at the rear ends of the tubes 100.

There is a single honeycomb section 70' which is provided with holes for insertion of the tubes 100. The overall operation of the second embodiment 18' is generally the same as in the first embodiment. However, the use of the tubes 100 instead of the corrugated section 76 may under certain circumstances provide structural benefits and/or advantages in fabrication.

Figure 10:
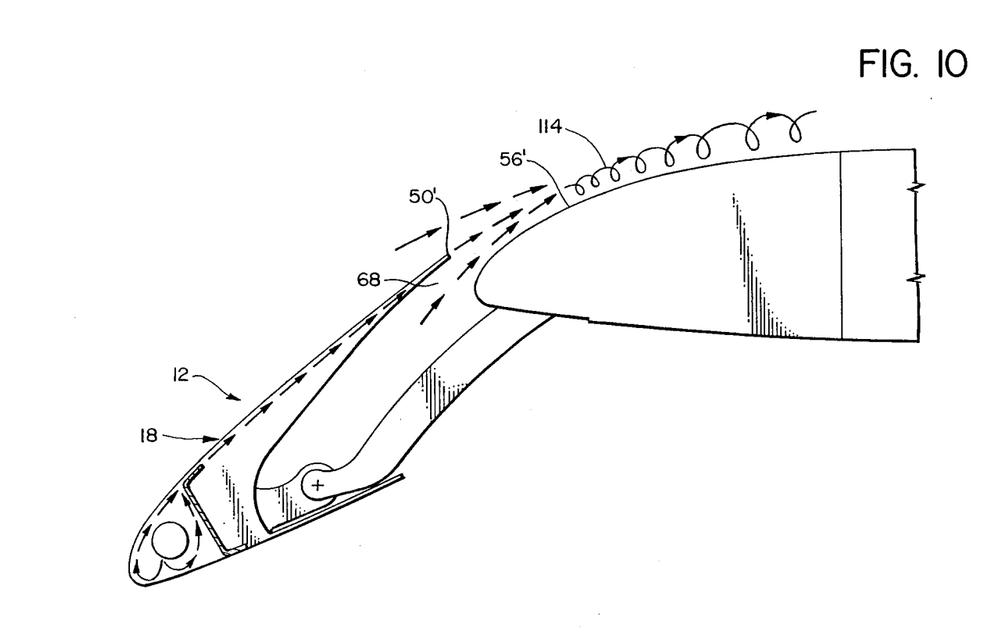
FIG. 10 is a view similar to FIG. 4, illustrating how the modification illustrated in FIG. 9 could be used to generate a vortex over the upper surface of the main wing structure.

To describe another facet of the present invention, reference is made to FIGS. 9 and 10. In certain circumstances, it may be desirable to arrange the airflow from the slat trailing edge (50 or 50') so that instead of being essentially a sheet of air, a vortex or a plurality of vortices may be generated. FIG. 9 is a somewhat schematic showing of the exhaust nozzles 80' of the second embodiment. For ease of illustration, only two tube ends 108 of the exhaust nozzle 80' are shown, and the view of FIG. 9 is taken looking directly into the rear of the nozzles 80'. The flow, indicated at 110, from the left tube end 108 is directed (as seen in FIG. 9) at a downward slant to the right. The flow (indicated at 112) from the right tube end 108 is directed rearwardly but at an upward slant somewhat to the left. This can be accomplished, for example, by deflectors, or possibly by bending the nozzles 80' moderately in a manner well known in the prior art. The effect of this would be to create a vortex traveling rearwardly over the upper wing surface 56 or 56'.

This feature of generating a desirable vortex is illustrated rather schematically in FIG. 10, where the slat 18' is in its fully extended high lift position, forming a slot 68'. The vortex generated aft of the slat trailing edge 50' is illustrated at 114. It is to be understood that the illustrations in FIGS. 9 and 10 are highly schematic, and the manner in which the trailing edge portion of the slat 18 is modified to generate such a vortex or vortices will depend upon the precise nature of the aerodynamic effect desired.

It is to be understood that the preceding description is to disclose certain preferred embodiments of the present invention, and that certain modifications can be made without departing from the basic teachings of the present invention.

I claim:

1. A leading edge assembly for an aircraft comprising:
   a. an airfoil having a fixed leading edge airfoil structure, providing a leading edge for the airfoil, a trailing edge portion, and upper and lower surfaces extending rearwardly from the leading edge;
   b. a leading edge member mounted to said fixed leading edge structure so as to be movable between at least two operating positions, namely a first retracted position for cruise, and a second deployed position, said leading edge member comprising:
      1. a nose section having an exterior surface and having a spanwise extending structural beam which is positioned rearwardly of said exterior surface, said exterior surface and said structural beam defining a heat exchange chamber to contain anti-icing air which passes through said chamber in heat exchange relationship with said exterior surface;
      2. an aft section having a forward portion connecting to the nose section and a rear portion, said aft section having an upper surface portion extending from the front portion to a trailing edge at the rear portion and also having a lower surface portion, said aft section defining a heat exchange passageway means having a forward inlet to receive anti-icing air from said chamber and a rear trailing edge outlet positioned at said trailing edge and opening in a rearward direction from said trailing edge so as to discharge said anti-icing air along a path having a substantial rearward alignment component generally parallel with the upper surface portion of the aft section adjacent to the trailing edge of the leading edge member, said aft section comprising a lower structural section which is adjacent to and extends along said lower surface portion and which comprises a cellular structure to provide structural support at said lower surface portion, said aft section also comprising an upper structural section which is positioned above said lower structural section and which is adjacent to and extends along said upper surface portion, said upper and lower structural sections being in load bearing relationship relative to one another and providing structural support between said upper and lower surfaces, said upper structural section comprising passageway defining wall members which support said upper surface portion and extend in a forward to rear direction from the front portion to the rear portion of the aft section to define a plurality of heat exchange passageways which are in heat exchange relationship with said upper surface poriton and which comprise said heat exchange passageway means,
   c. said leading edge member being characterized in that when said leading edge member is in at least one of said operating positions, the trailing edge of the leading edge member is positioned immediately adjacent to the upper surface of the airfoil in a manner that the deicing air discharged from the trailing edge of the leading edge member flows immediately over the upper surface of the airfoil so as to be in heat exchange relationship therewith;
   d. means to direct anti-icing air into said heat exchange chamber in the nose section so as to cause said anti-icing air to flow through said passageway means in the aft section to pass from the trailing edge of the leading edge member.

2. The assembly as recited in claim 1, wherein said leading edge member is characterized in that in said retracted position, the nose section of the leading edge member is positioned adjacent to and forwardly of the leading edge airfoil structure, and the trailing edge of the leading edge member is positioned above a forward part of the upper surface of the airfoil, with the trailing edge of the leading edge member being positioned immediately adjacent to the upper surface of the airfoil.

3. The assembly as recited in claim 2, wherein said leading edge member is characterized in that with the leading edge member in the deployed position, the leading edge member is at a location which is further forward than a position of the leading edge member at the retracted position, and the trailing edge of the leading edge member is adjacent to the upper surface of the airfoil at an anti-icing air discharge location which is forwardly of a location where the trailing edge of the leading edge member is positioned when the leading edge member is in the retracted position.

4. The assembly as recited in claim 1, wherein said leading edge member is characterized in that with the leading edge member in the deployed position, the leading edge member is at a location which is further forward than a position of the leading edge member at the retracted position, and the trailing edge of the leading edge member is adjacent to the upper surface of the airfoil at an anti-icing air discharge location which is forwardly of a location where the trailing edge of the leading edge member is positioned when the leading edge member is in the retracted position.

5. The assembly as recited in claim 1, wherein said passageway defining wall members are interconnected in a plurality of generally U-shaped configurations, relative to a cross-section taken across said passageways.

6. The assembly as recited in claim 1, wherein said trailing edge outlet is so arranged as to cause air discharged therefrom to create a vortex flow over the upper surface of the airfoil.

7. A leading edge assembly for an aircraft comprising:
a. an airfoil having a fixed leading edge airfoil structure, providing a leading edge for the airfoil, a trailing edge portion, and upper and lower surfaces extending rearwardly from the leading edge;
b. a leading edge slat mounted to said fixed leading edge structure so as to be movable between at least three operating positions, namely a first retracted position for cruise, a second intermediate position, and a third fully deployed position, said leading edge slat comprising:
  1. a nose section having an exterior surface and having a spanwise extending structural beam which is positioned rearwardly of said exterior surface, said exterior surface and said structural beam defining a heat exchange chamber to contain anti-icing air which passes through said chamber in heat exchange relationship with said exterior surface;
  2. an aft section having a forward portion connecting to the nose section and a rear portion, said aft section having an upper surface portion extending from the front portion to a trailing edge at the rear portion and also having a lower surface portion, said aft section defining a heat exchange passageway means having a forward inlet to receive anti-icing air from said chamber and a rear trailing edge outlet positioned at said trailing edge and opening in a rearward direction from said trailing edge so as to discharge said anti-icing air along a path having a substantial rearward alignment component generally parallel with the upper surface portion of the aft section adjacent to the trailing edge of the slat, said aft section comprising a lower structural section which is adjacent to and extends along said lower surface portion and which comprises a cellular structure to provide structural support at said lower surface portion, said aft section also comprising an upper structural section which is positioned above said lower structural section and which is adjacent to and extends along said uper suface portion, said upper and lower structural sections being in load bearing relationship relative to one another and providing structural support between said upper and lower surfaces, said upper structural section comprising passageway defining wall members which support said upper surface portion and extend in a forward to rear direction from the front portion to the rear portion of the aft section to define a plurality of heat exchange passageways which are in heat exchange relationship with said upper surface portion and which comprise said heat exchange passageway means,
c. said leading edge slat being characterized in that:
  1. when said leading edge slat is in said retracted position, the nose section of the slat is positioned adjacent to and forwardly of the leading edge airfoil structure, and the trailing edge of the slat is positioned immediately adjacent to the upper surface of the airfoil in a manner that the deicing air discharged from the trailing edge of the slat flows immediately over the upper surface of the airfoil so as to be in heat exchange relationship therewith;
  2. with the leading edge member in the intermediate position, the leading edge member is at a location which is further forward than a position of the leading edge member at the retracted position, and the trailing edge of the leading edge member is adjacent to the upper surface of the airfoil at an anti-icing air discharge location which is forwardly of a location where the trailing edge of the leading edge member is positioned when the leading edge member is in the retracted position;
  3. with the slat in said fully depolyed position the trailing edge of the slat is spaced from the leading edge airfoil structure so as to form a slot therewith.
d. means to direct anti-icing air into said heat exchange chamber in the nose section so as to cause said anti-icing air to flow through said passageway means in the aft section to pass from the trailing edge of the leading edge member.

8. The assembly as recited in claim 7, wherein said passageway defining wall members are interconnected in a plurality of generally U-shaped configurations, relative to a cross-section taken across said passageways.

9. The assembly as recited in claim 7, wherein said trailing edge outlet is so arranged as to cause air discharged therefrom to create a vortex flow over the upper surface of the airfoil.

* * * * *